Dec. 26, 1961  A. CANDELISE ETAL  3,014,979
IGNITION LEAD CABLE
Filed Dec. 18, 1958
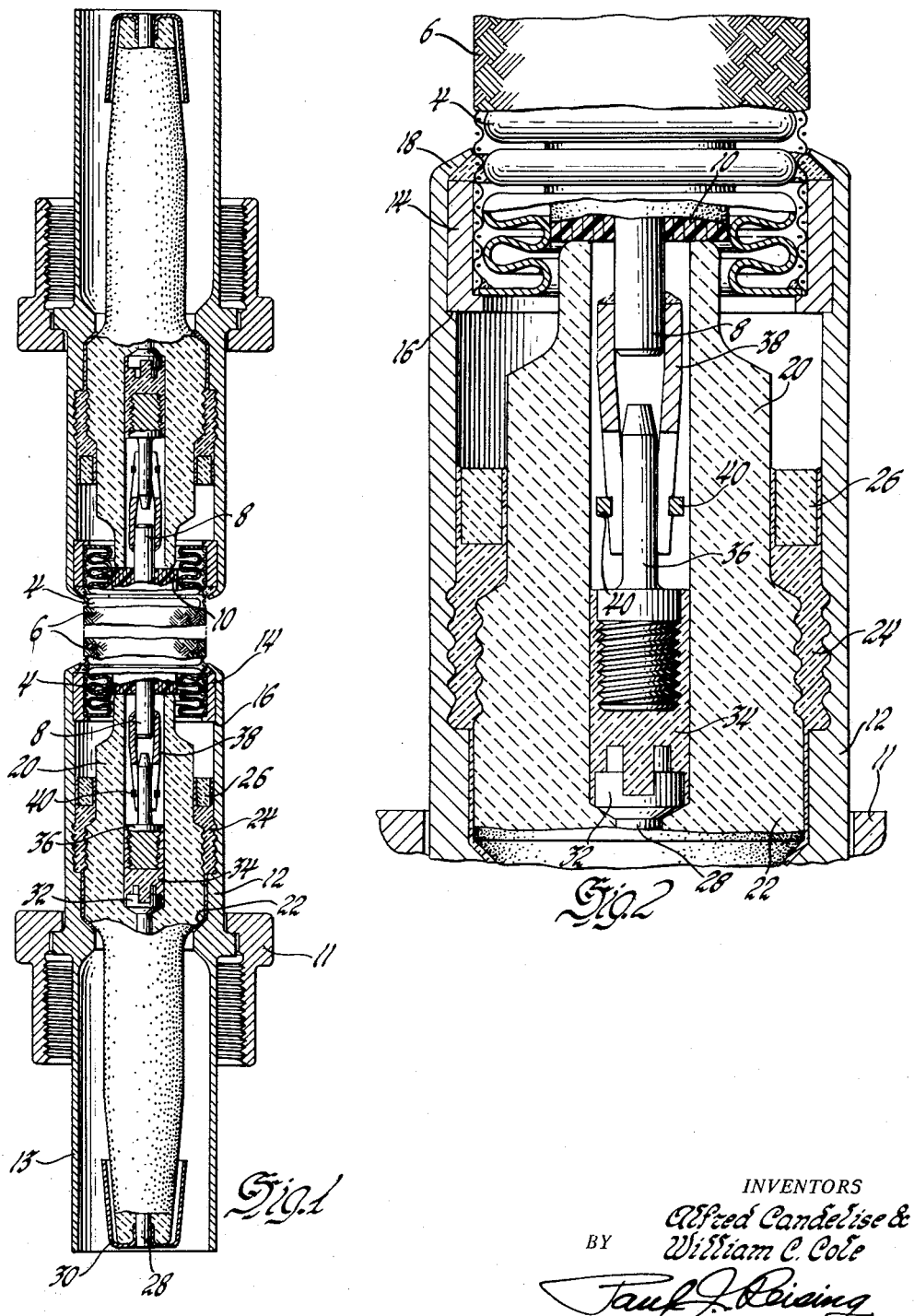
INVENTORS
Alfred Candelise &
BY  William C. Cole
Paul J. Rising
ATTORNEY

United States Patent Office 3,014,979
Patented Dec. 26, 1961

3,014,979
IGNITION LEAD CABLE
Alfred Candelise, Flint, and William C. Cole, Grand Blanc, Mich., assignors to General Motors Corporation, Detroit, Mich., a corporation of Delaware
Filed Dec. 18, 1958, Ser. No. 781,373
4 Claims. (Cl. 174—75)

This invention relates to an ignition lead cable and, more particularly, to an ignition lead cable for use in jet or turboprop gas turbine type aircraft engines for connection of the igniter plugs to the ignition system.

With the advent and further development of improved aircraft gas turbine engines and the attendant increase in high altitude flying there has arisen a particular need for an igniter plug ignition lead cable which will assure against flash-over within the cable at high altitudes and which will also withstand the high temperatures associated with gas turbine engine operation and additionally provide the flexibility required to allow expeditious assembly of the cable onto the engine. It is an object of the present invention to provide such an ignition lead cable. More specifically, it is an object of the present invention to provide the ignition lead cable which is heat resistant, flexible and which is permanently hermetically sealed at atmospheric pressure for assurance against arcing within the cable irrespective of the altitude at which it is operating. Other objects and advantages of the invention will appear more clearly from the following description of a preferred embodiment thereof made with reference to the appended drawings in which:

FIGURE 1 is a side view, in partial section and with parts broken away, of a preferred ignition lead cable; and FIGURE 2 is a side view in section of a portion of the device shown in FIGURE 1, but in larger scale.

Referring now to the drawings, the ignition lead cable comprises a thin-walled tube 4 of a metal, preferably stainless steel, which is accordion-pleated as in the form of a bellows so as to provide the desired flexibility. The tube may, of course, be of any length as needed, the entire center portion of the cable being broken away in FIGURE 1 merely to condense the drawing. The tube is preferably covered with a flexible meshed wire sheath 6 to protect against damage to the thin-walled tube. Extending through the tube is a metal wire 8 which for optimum heat resistance together with good conductivity should preferably be of copper cored nickel. The wire is separated and therefore electrically insulated from the accordion-pleated tube preferably by a plurality of flexible concentric closely woven fiberglass sleeves 10. For extremely high temperature applications, woven silica fiber or mullite fiber may be used. At each end of the cable is a terminal connector assembly to which the tube and conductor wire are hermetically sealed. One of these connector assemblies is, of course, for securement to the igniter plug, and the other for securement to the ignition system electrical outlet. Since both assemblies are essentially identical in structure, a description of one of them will suffice for both.

Referring now to the bottom terminal connector as shown in FIGURE 1 and also in FIGURE 2, the assembly comprises a rigid tubular shaped metal member 12, preferably of stainless steel, having an internally threaded collar 11 turnably secured to the exterior surface thereof for threaded fitment to the upper end of an igniter plug (not shown). The bottom skirt portion 13 of the member 12 is not an essential or significant feature of the structure; it is merely for the purpose of fitting between the insulator and shielding barrel of one particular type of igniter plug and therefore forms no part of the present invention. The upper end of the member 12 is brazed or welded in hermetically sealed relationship with the flexible tube 4, this being accomplished by first brazing a metal sleeve 14 over the end of the flexible tube 4 (and its associated meshed wire sheath) and then inserting the sleeve into the member 12 until it rests on the annular shoulder provided at 16 after which the upper end of the member 12 is brazed to the sleeve 14 and then crimped inwardly as shown at 18. For optimum temperature resistance it is desirable to use a high temperature brazing material, preferably silver solder, for the various brazed joints. An elongated ceramic insulator 20 having a centerbore therethrough is positioned concentrically within the member 12 by way of a shoulder 22 which cooperates with an inner annular shoulder within the member 12, a thin metal gasket being pressed between these two cooperating shoulders. To bond and hermetically seal the insulator to the tubular metal member 12, there is provided an annular mass of fused conductive glass 24, the opposed bonded surfaces of the insulator and shell preferably being formed with a plurality of grooves as shown in order to provide maximum bonding surface area. The function of the ceramic ring 26 is with respect to the method used for manufacture of the cable and will thus be described later in that connection.

Extending through the centerbore of the ceramic insulator is an electrical conductor the bottom end of which is formed by a nickel wire 28 bonded at its bottom end to an electrical contact member 30 adapted to make electrical connection with the electrical terminal of the igniter plug (not shown) for which the cable serves as the ignition lead. The precise shape of the bottom of the insulator and the contact member 30 form no part of the invention since they are merely for the purpose of fitting a particular type of igniter plug. The upper end of the nickel wire has a head portion 32 which is positioned in an upper enlarged portion of the centerbore. Within this centerbore portion is an electrically conductive fused mixture 34 of glass and metal powder which is bonded to the insulator, to the head portion 32 and to a metal pin 36. Thus, the conductive glass 34 provides a hermetic seal within the centerbore of the insulator and electrically conductive path from the pin 36 to the nickel wire 30. The bottom end of the pin 36 is threaded and the head 32 grooved in order to provide maximum bonding surface area with the conductive glass seal. To complete the electrical connection of the electrical contact 30 with the wire 8, the wire has brazed to the end thereof a split resilient metal tube 38 which matingly engages the upper shank portion of the pin 36. A metal spring ring 40 surrounding the bottom end of the tube assures a tight fit and good electrical contact with the pin.

The cable is manufactured as follows: Metal wire 28 is inserted into the insulator and bonded to the contact member 30. Then a charge of powdered glass-metal mixture is placed in the insulator centerbore and the assembly is heated until the mixture softens at which time the pin 36 is pressed down into the softened mixture, the assembly then being allowed to cool. The insulator, along with its associated gasket, is positioned within the tubular metal member 12 and a charge of powdered glass-metal mixture, along with ceramic ring 26, is then inserted between the insulator and the tubular member. This assembly is heated until the glass mixture softens and the ceramic ring 26 is forced downwardly so as to press the molten glass into good bonding and sealing engagement with the parts, the ceramic ring thereby becoming embedded in the glass mixture. After the split resilient tube 38 with associated metal spring ring 40 has been brazed to the terminus of the metal wire 8, and the sleeve 14 brazed in sealed relationship to the end of the flexible tube 4, the upper end of the tubular member 12 is placed concentrically over the sleeve 14 and then brazed and crimped thereto, as shown at 18. As the member 12 is inserted over the sleeve 14, the resilient tube 38 positions itself over the pin 36 to complete the electrical connection, the upper end of the pin preferably being tapered in order to facilitate and assure the mating engagement of these parts.

The much preferred material for the seal 34 consists of 80% or more tungsten powder and the remainder a borosilicate glass, for example, about 88% (by weight) tungsten powder and about 12% Pyrex (sodium boro-aluminum silicate glass). For the seal 24, about 55% copper powder and 45% of the sodium boroaluminum silicate glass may be used. The metal powder in the seal 24 while not essential is highly advantageous in that it functions to provide improved heat conductivity and a higher coefficient of expansion and to assure a better, more durable bond. The insulator 22 should preferably be of the high alumina ceramic type showing on analysis upwards of 90% by weight alumina and the remainder substantially all silica and alkaline earth oxides. United States Patent 2,760,875, issued to Karl Schwartzwalder and Helen Blair Barlett on August 28, 1956, covers an insulator composition of this type. Such high alumina insulators have very high heat shock resistance and thus are not subject to failures from cracking during the glass sealing operations.

The ignition cable of this invention is particularly advantageous in that it is not only hermetically sealed at atmospheric pressure to thereby assure against flash-over irrespective or altitude, but is also highly heat resistant to withstand the very high temperatures of around 800° F. and higher attendant to modern gas turbine engines, and is sufficiently flexible to facilitate its installation. Further, even though the cable is flexible, all of its component parts are adequate to assure against rupture or distortion even at extremely high altitudes where there is a considerable pressure differential between the interior and exterior of the device. Because ground level atmospheric air pressure is maintained within the cable at all times, the high temperature resistant ceramic fiber sheath 10 which maintains the spacing between the conductor wire and the metal tube 4 assures fully adequate electrical insulation for the relatively low voltage currents used in gas turbine engine ignition systems. If higher voltages are to be used so as to require additional insulation, the flexible tube 4 can be made of increased diameter, and additional ceramic fiber sleeves used, to provide a larger atmospheric air space between the conductor and the tube. Thus, in all instances good electrical insulation is provided without the need for rubber or similar low temperature resistant materials, or for nonflexible solid ceramic tubes or the like.

While the invention has been described in detail specifically with reference to a preferred embodiment thereof, it will be understood that changes and modifications may be made, all within the scope of the claims which follow.

We claim:

1. An ignition lead cable comprising a flexible thin-walled metal tube, a flexible metal wire extending through said tube in spaced relationship thereto, and a terminal connector assembly at each end of said tube, at least one of said terminal connector assemblies comprising a tubular metal member having one end bonded in hermetically sealed relationship to said metal tube, a ceramic insulator having a centerbore therethrough positioned concentrically in said tubular metal member, an electrical conductor connected to said metal wire and extending through said centerbore, a portion of said electrical conductor being a fused conductive mixture of glass and metal powder which forms a hermetic seal in said centerbore, and an annular mass of fused glass bonding and hermetically sealing said insulator to said tubular metal member.

2. An ignition lead cable comprising a flexible thin-walled accordian-pleated metal tube, a protective flexible meshed wire sheath surrounding said tube, a metal wire extending through said tube, a flexible sheath of concentric woven ceramic fiber sleeves surrounding said wire to separate said wire from said tube, and a terminal connector assembly at each end of said tube, at least one of said terminal connector assemblies comprising a tubular metal member having one end bonded in hermetically sealed relationship to said metal tube, a ceramic insulator having a centerbore therethrough positioned concentrically in said tubular metal member, an electrical conductor connected to said metal wire and extending through said centerbore, a portion of said electrical conductor being a fused conductive mixture of glass and metal powder which forms a hermetic seal in said centerbore, and an annular mass of fused glass bonding and hermetically sealing said insulator to said tubular metal member.

3. An ignition lead cable comprising a flexible thin-walled accordian-pleated metal tube, a flexible metal wire extending through said tube, a flexible ceramic fiber sleeve surrounding said wire, and a terminal connector assembly at each end of said tube, at least one of said terminal connector assemblies comprising a tubular metal member having one end bonded in hermetically sealed relationship to said metal tube, a ceramic insulator having a centerbore therethrough positioned concentrically in said tubular metal member, an electrical conductor connected to said metal wire and extending through said centerbore, a portion of said electrical conductor being a fused conductive mixture of glass and metal powder which forms a hermetic seal in said centerbore, and an annular mass of a fused mixture of glass and metal powder bonding and hermetically sealing said insulator to said tubular metal member.

4. An ignition lead cable comprising a flexible thin-walled accordian-pleated metal tube, a flexible metal wire extending through said tube in spaced relationship thereto, and a terminal connector assembly at each end of said tube, at least one of said terminal connector assemblies comprising a tubular metal member having one end bonded in hermetically sealed relationship to said metal tube, a ceramic insulator having a centerbore therethrough positioned concentrically in said tubular metal member, an annular mass of fused glass bonding and hermetically sealing said insulator to said tubular metal member, an electrical conductor in said centerbore, a portion of said electrical conductor being a fused conductive mixture of glass and metal powder which forms a hermetic seal in said centerbore, a metal pin having one end embedded in said conductive mixture, and a resilient metal tube having one end bonded to said metal wire and the other end in tight mating engagement with said pin.

References Cited in the file of this patent

UNITED STATES PATENTS

| | | |
|---|---|---|
| 1,170,959 | Campbell | Feb. 8, 1916 |
| 1,989,893 | Taylor | Feb. 5, 1935 |
| 2,106,578 | Schwartzwalder et al. | Jan. 25, 1938 |
| 2,248,415 | Schwartzwalder et al. | July 8, 1941 |
| 2,367,175 | Hahn | Jan. 9, 1945 |
| 2,438,146 | Candee et al. | Mar. 23, 1948 |
| 2,459,282 | McDougal et al. | Jan. 18, 1949 |
| 2,550,014 | Lituchy | Apr. 24, 1951 |
| 2,640,118 | Werner | May 26, 1953 |
| 2,759,989 | Anderson | Aug. 21, 1956 |
| 2,760,875 | Schwartzwalder et al. | Aug. 28, 1956 |
| 2,781,785 | Davis | Feb. 19, 1957 |